US010424955B2

(12) United States Patent
Higgins et al.

(10) Patent No.: US 10,424,955 B2
(45) Date of Patent: Sep. 24, 2019

(54) CHARGING SYSTEM WITH COMPRESSIBLE CONTACTS

(71) Applicant: Starkey Laboratories, Inc., Eden Prairie, MN (US)

(72) Inventors: Sidney A. Higgins, Maple Grove, MN (US); David Tourtelotte, Eden Prairie, MN (US); Kyle Olson, St. Louis Park, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 15/337,141

(22) Filed: Oct. 28, 2016

(65) Prior Publication Data

US 2018/0123367 A1 May 3, 2018

(51) Int. Cl.
*H02J 7/00* (2006.01)
*H01R 13/24* (2006.01)
*H04R 25/00* (2006.01)

(52) U.S. Cl.
CPC ........ *H02J 7/0045* (2013.01); *H01R 13/2414* (2013.01); *H02J 7/0027* (2013.01);
(Continued)

(58) Field of Classification Search
CPC ...... H02J 7/0045; H02J 7/0047; H02J 7/0072; H04R 25/556; H04R 2225/31
(Continued)

(56) References Cited

U.S. PATENT DOCUMENTS 3,964,296 A * 6/1976 Matzuk ............... A61B 8/00
73/607
4,097,792 A * 6/1978 Calaway .............. H02J 7/0081
320/151

(Continued)

FOREIGN PATENT DOCUMENTS

CN 204631181 U 9/2015
DE 102009033898 B3 11/2010

OTHER PUBLICATIONS

Siemens, "eCharger User Guide—Master", Sep. 2014; 1-20.
(Continued)

*Primary Examiner* — M Baye Diao
(74) *Attorney, Agent, or Firm* — Mueting, Raasch & Gebhardt, PA

(57) ABSTRACT

A recharging system includes a contact pad charger having a compressible contact pad conformable to a rechargeable device body for charging a power storage device in the rechargeable device body. The contact pad charger includes a power supply configured to provide a supply voltage. The compressible contact pad is electrically coupled to the power supply and defines a first variable resistance in response to a first conductor compression. The rechargeable device body includes a power manager electrically coupled to the power supply and is configured to receive a variable input voltage in response to a first variable voltage drop across the first conductor and to provide a regulated output voltage in response to the received variable input voltage. The regulated output voltage is less than the supply voltage. The power storage device is electrically coupled to the power manager and configured to receive the regulated output voltage for charging.

25 Claims, 11 Drawing Sheets

(52) U.S. Cl.
CPC .......... *H02J 7/0044* (2013.01); *H02J 7/0047* (2013.01); *H02J 7/0072* (2013.01); *H04R 25/55* (2013.01); *H04R 25/556* (2013.01); *H04R 2225/31* (2013.01)

(58) Field of Classification Search
USPC ........................................................ 320/107
See application file for complete search history.

(56) References Cited

U.S. PATENT DOCUMENTS

| | | | |
|---|---|---|---|
| 5,280,229 A | 1/1994 | Faude et al. | |
| 5,527,637 A * | 6/1996 | Nakazawa | B60K 17/043 180/68.5 |
| 5,610,494 A | 3/1997 | Grosfilley | |
| 5,623,550 A | 4/1997 | Killion | |
| 5,635,819 A | 6/1997 | Ryberg | |
| 5,742,149 A | 4/1998 | Simpson | |
| 6,275,681 B1 * | 8/2001 | Vega | G06K 7/0008 455/41.1 |
| 6,399,920 B1 | 6/2002 | Guinn | |
| 6,625,900 B1 | 9/2003 | Tobias | |
| 6,879,809 B1 * | 4/2005 | Vega | G06K 7/0008 455/41.1 |
| 7,005,832 B2 | 2/2006 | Nordlöf | |
| 7,449,875 B2 | 11/2008 | Chang | |
| 7,515,725 B2 | 4/2009 | Fluit | |
| 7,620,195 B2 | 11/2009 | Bengtsson et al. | |
| 7,710,079 B2 * | 5/2010 | Martin | H02J 7/0068 320/145 |
| 7,847,516 B2 | 12/2010 | Kung et al. | |
| 8,098,862 B2 | 1/2012 | Koch et al. | |
| 8,329,323 B2 * | 12/2012 | Atkinson | H01M 2/1055 429/120 |
| 9,148,717 B2 | 9/2015 | Shaffer | |
| 9,354,538 B2 * | 5/2016 | Seki | G03G 15/80 |
| 9,362,766 B2 * | 6/2016 | Workman | H02J 7/0042 |
| 9,621,999 B2 | 4/2017 | Sudan | |
| 2003/0098670 A1 | 5/2003 | Kobayashi | |
| 2005/0027465 A1 | 2/2005 | Pozsgay et al. | |
| 2005/0253554 A1 | 11/2005 | DiFazio et al. | |
| 2008/0240480 A1 | 10/2008 | Pinnell et al. | |
| 2009/0034749 A1 | 2/2009 | Klemenz et al. | |
| 2009/0067652 A1 | 3/2009 | Schmidt et al. | |
| 2009/0074219 A1 | 3/2009 | Klemenz et al. | |
| 2010/0060232 A1 | 3/2010 | Boyles et al. | |
| 2010/0317977 A1 * | 12/2010 | Piaget | A61B 5/0031 600/486 |
| 2011/0007491 A1 * | 1/2011 | Robinson | G06F 1/263 361/810 |
| 2011/0181242 A1 | 7/2011 | Lee | |
| 2011/0234160 A1 | 9/2011 | Smith | |
| 2013/0015824 A1 | 1/2013 | Newton | |
| 2014/0261425 A1 * | 9/2014 | Connor | A61M 16/022 128/204.23 |
| 2015/0130406 A1 | 5/2015 | Jing | |
| 2015/0200558 A1 | 7/2015 | Castillo et al. | |
| 2015/0214755 A1 | 7/2015 | Crawley | |
| 2015/0229151 A1 | 8/2015 | Sudan et al. | |
| 2015/0326982 A1 | 11/2015 | Sudan | |
| 2015/0357742 A1 * | 12/2015 | Lee | H01R 4/66 307/326 |
| 2015/0380961 A1 | 12/2015 | Tseng et al. | |
| 2017/0094393 A1 | 3/2017 | Panecki et al. | |
| 2017/0279165 A1 | 9/2017 | Tanii | |

OTHER PUBLICATIONS

"WildCharge Cordless Charging Mat Review", Retrieved Oct. 25, 2016 from https://www.youtube.com/watch?v=gP-jHI3-FEY, Nov. 28, 2009; 1.

ZPower Rechargeable System for Hearing Aids, "User Manual", 2016; 1-16.

Partial European Search Report for European Patent Application No. 17195019.9, dated Feb. 20, 2018, 14 pages.

U.S. Appl. No. 15/797,239, filed Oct. 30, 2017, Olson et al.

European Search Report for European Patent Application No. 17195019.9, dated May 24, 2018, 12 pages.

* cited by examiner

CHARGING SYSTEM WITH COMPRESSIBLE CONTACTS

TECHNICAL FIELD

The present disclosure relates to a charger. In particular, the present disclosure relates to a contact pad charger having compressible contact pads conformable to a rechargeable device body of a hearing device.

BACKGROUND

Hearing devices may include hearing aids or a device with a transducer for providing personalized sound to an individual's ear. For example, hearing aids may be used to assist a person suffering from hearing loss by transmitting amplified sound directly to the person's ear canals. In one example, a hearing aid is worn in and/or around a person's ear and may be contoured with curved surfaces to facilitate comfort in use. Many hearing devices are portably powered with a battery. Some hearing devices with rechargeable batteries may be recharged in a specific charging station.

Various charging stations utilize direct connections through conductive metal plates or pins that make contact with metal plates or pins on the hearing device for charging, such as blade or pogo-pin style chargers that have net shape pockets or magnetic assist retainers. Typically, the hearing device must be placed standing on end and aligned according to the proper polarity to facilitate insertion for charging. A direct connection may transfer electrical power efficiently, but such chargers may require precise seating of the hearing device in a "blind" pocket to ensure proper charging, may suffer from scratched or damaged contact plates with repeated charging cycles, and may be difficult to clean. Some other charging stations are wireless, such as an induction style charger. A wireless connection may accommodate flexible placement of a hearing device on a charging pad, but such chargers are complex and are often inefficient in transferring electrical power.

SUMMARY

In general, the present disclosure provides a contact pad charger that includes a compressible contact pad conformable to a rechargeable device body. The contact pad charger can accept the rechargeable device body in a variety of orientations within a charging cavity while maintaining a direct connection for charging.

In one aspect, the present disclosure provides a system that includes a power supply configured to provide a supply voltage between a first terminal and a second terminal. The system also includes a compressible first conductor electrically coupled to the first terminal and defining a first variable resistance in response to a first conductor compression. The system further includes a power manager electrically coupled between the first conductor and the second terminal. The power manager is configured to receive a variable input voltage in response to a first variable voltage drop across the first conductor and provide a regulated output voltage in response to the received variable input voltage. The regulated output voltage is less than the supply voltage. The system also includes a power storage device electrically coupled to the power manager and configured to receive the regulated output voltage for charging.

In another aspect, the present disclosure provides an apparatus for charging a rechargeable device body. The apparatus includes a compressible conductor having an interior portion defining a flexible charging surface and a perimeter portion laterally surrounding the interior portion. The compressible conductor also defines a variable resistance between the interior portion and the perimeter portion in response to a conductor deformation. The apparatus also includes a non-conductive liner aligned to the perimeter portion. The non-conductive liner defines an opening aligned to the interior portion of the compressible conductor to define a charging cavity configured to receive the rechargeable device body for contact with the flexible charging surface. The charging cavity is configured to receive the rechargeable device body for charging in more than one orientation. Further, the apparatus includes a contact plate electrically coupled to the perimeter portion and configured to be electrically coupled to the rechargeable device body in the charging cavity via the interior portion.

In another aspect, the present disclosure provides an apparatus for charging a rechargeable device having a body with a first side with a first charging portion and a second side opposite the first side with a second charging portion. The apparatus includes a base having a compressible first conductor and a compressible first insulator adjacent to the first conductor. The first conductor defines a first variable resistance in response to a first conductor deformation. The apparatus also includes a lid having a compressible second conductor and a compressible second insulator adjacent to the second conductor. The second conductor defines a second variable resistance in response to a second conductor deformation. The lid is movable between an open position and a closed position relative to the base. The closed position of the lid is configured to contact the first conductor with one of the first and second charging portions and contact the second conductor with the other of the first and second charging portions. The apparatus further includes a charging cavity defined between the first and second conductors configured to receive the rechargeable device body for charging in more than one orientation when the lid is in the closed position.

It is to be understood that both the foregoing general description and the following detailed description present embodiments of the subject matter of the present disclosure, and are intended to provide an overview or framework for understanding the nature and character of the subject matter of the present disclosure as it is claimed.

BRIEF DESCRIPTION OF THE DRAWINGS

The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

Figure 1:
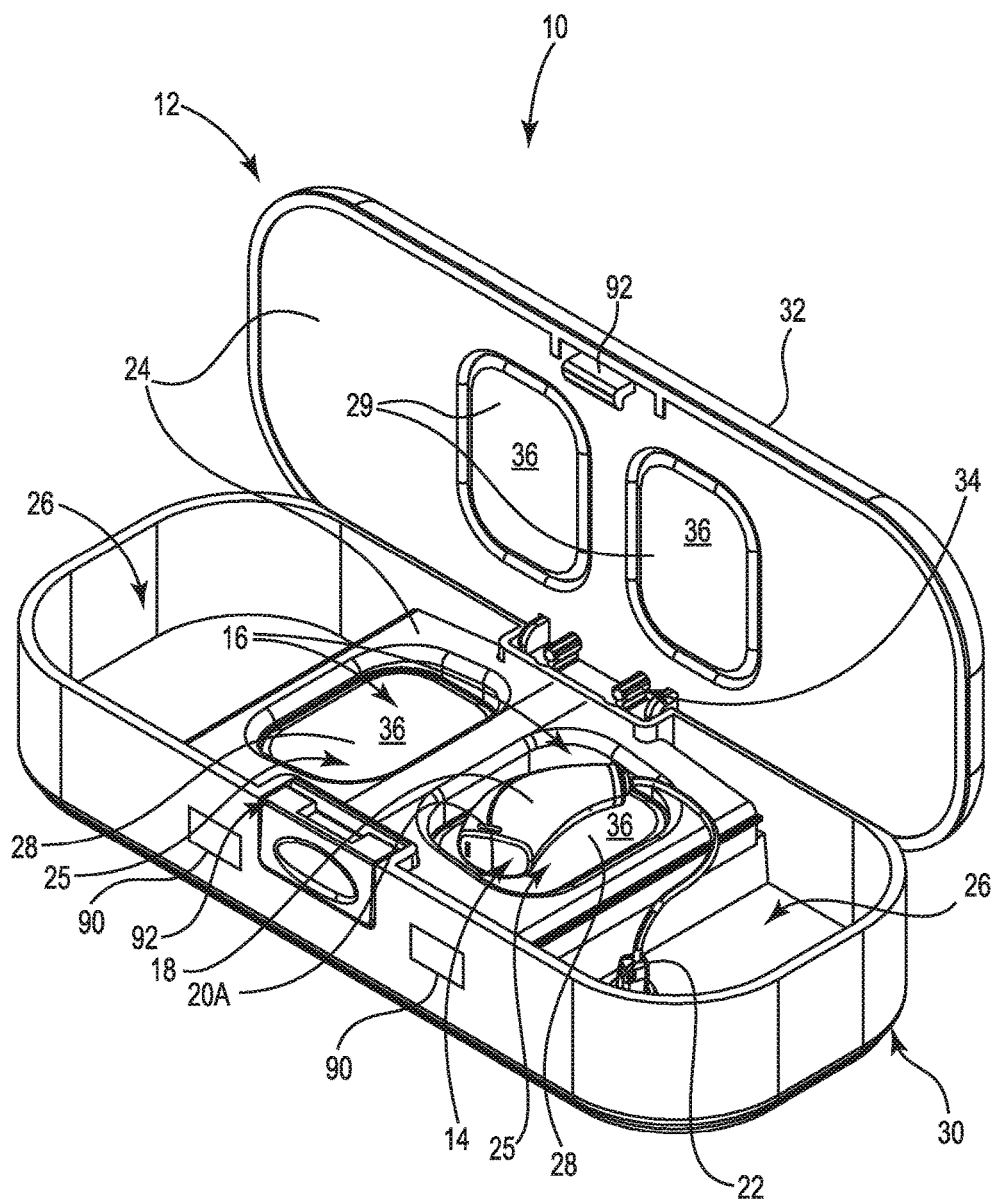
FIG. 1 is an overhead perspective view of a recharging system including a contact pad charging apparatus and a rechargeable device according to various embodiments of the present disclosure.

The disclosure may be more completely understood in consideration of the following detailed description of various embodiments of the disclosure in connection with the accompanying drawings.

DETAILED DESCRIPTION

In the following detailed description, reference is made to several specific embodiments. It is to be understood that other embodiments are contemplated and may be made without departing from the scope or spirit of the present disclosure. The following detailed description, therefore, is not to be taken in a limiting sense.

It would be beneficial to charge hearing devices in an easy-to-use manner that is also efficient in transferring electrical power, especially for portable charging applications. In particular, it would be desirable to provide a contact pad charger that offers easy placement of the hearing device relative to the charger, a protective envelope for the hearing device when charging, a low profile for portability and storage, flexibility for charging different hearing devices of different shapes (e.g., different thicknesses and contours), and flexibility for the design of the hearing device (e.g., placement of metal charging contacts).

The present disclosure describes a contact pad charger having a compressible contact pad that can conform to a body of a rechargeable hearing device. The charging cavity may be defined between one or more compressible conductors and be at least partially surrounded by a non-conductive liner. The contact pad charger can accept the body of the rechargeable hearing device in a variety of orientations within a charging cavity for charging with a wired connection for efficient charging. The compressible conductors mitigate scratching of contact plates on the rechargeable hearing device. The rechargeable hearing device itself may be provided with a rectifying circuit to provide even further flexibility in the placement within the charging cavity.

The present subject matter is demonstrated for rechargeable devices, which may be portable devices or wearable devices, such as hearing devices. Hearing devices may include hearing assistance devices, or hearing aids of various types, such as behind-the-ear (BTE), in-the-ear (ITE), in-the-canal (ITC), receiver-in-canal (RIC), or completely-in-the-canal (CIC) type hearing aids. It is understood that BTE type hearing aids may include devices that reside substantially behind the ear or over the ear. Such devices may include hearing aids with receivers associated with the electronics portion of the device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard, open fitted, or occlusive fitted. The present subject matter may additionally be used in consumer electronic wearable audio devices having various functionalities. It is understood that other devices not expressly stated herein may also be used in conjunction with the present subject matter.

The present disclosure may be used with various charging systems. For example, the present disclosure may be used with various aspects of the charging system disclosed in the concurrently-filed U.S. Provisional Patent Application 62/414,136 entitled CHARGING SYSTEM FOR CONTACT CHARGERS AND RELATED METHODS, filed on the same date as the present application, which is incorporated herein for all purposes.

Referring first to FIGS. 1 to 5, an example recharging system 10 is shown that includes a contact pad charger 12 and a rechargeable device 14. The rechargeable device 14 may interface with the contact pad charger 12 in a variety of orientations for charging and may also be enclosed for protection while charging.

Figure 2:
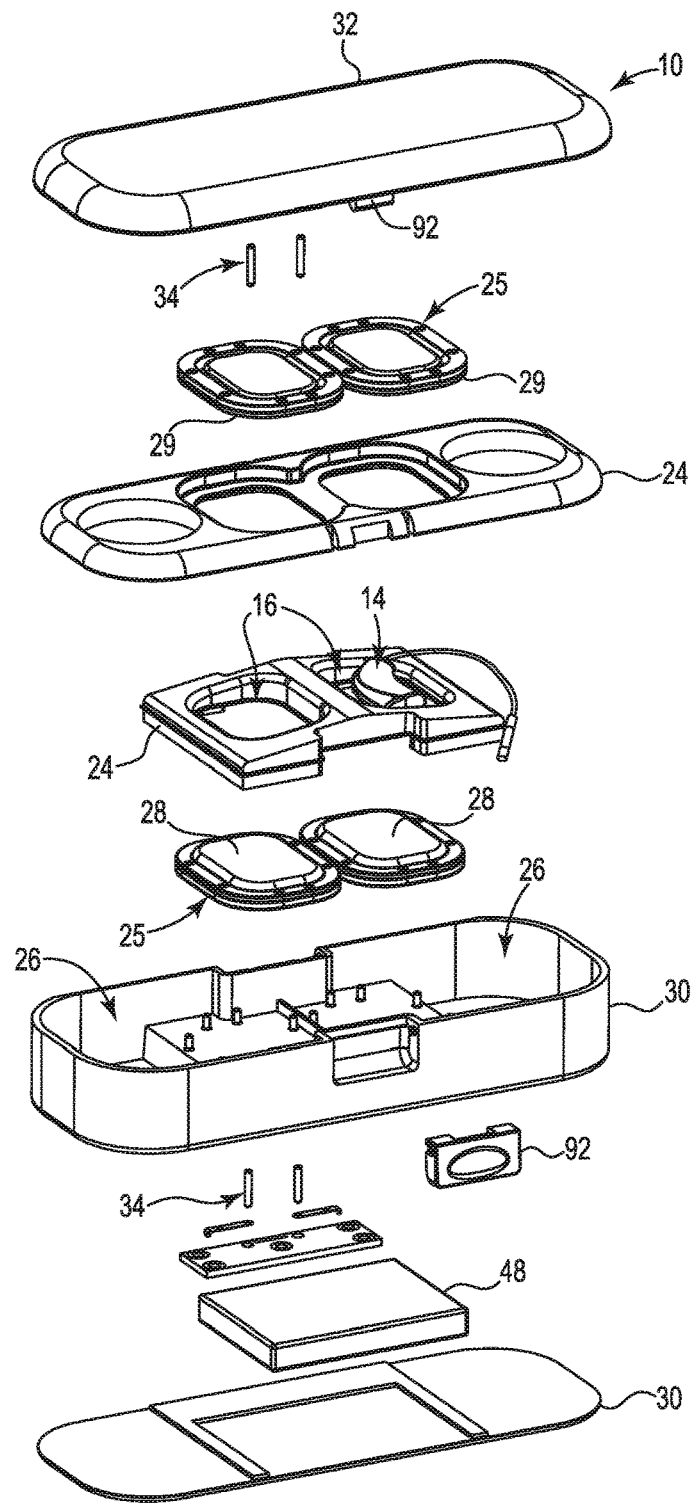
FIG. 2 is an exploded perspective view of the recharging system of FIG. 1.

As shown in FIGS. 1 and 2, for example, the contact pad charger 12 has an open position, in which the contact pad charger 12 can receive the rechargeable device 14 for charging. A charging cavity 16 may be defined by the contact pad charger 12 for receiving a body 18 of the rechargeable device 14 (e.g., device body) having a charging portion 20 (see FIG. 8), which may include charging portion $20_A$ and charging portion $20_B$ (see FIG. 6), and an optional non-charging portion 19 (see FIG. 6). In the illustrated embodiment, an extension portion 22 of the rechargeable device 14 is receivable into a well 26 of the contact pad charger 12. The contact pad charger 12 may include a liner 24 and conductors 28, 29 that define the charging cavity 16. The conductors 28, 29 may be compressible. Each conductor 28, 29 each may define a contact pad 25 that is flexible. The contact pad 25 may be described as providing a spring-like or resiliently deformable response.

The charging cavity 16 may be sized and shaped to receive the device body 18 in more than orientation for charging. For example, the device body 18 may be rested on either side 21, 23 (see FIG. 6) and in various rotational orientations while resting in the charging cavity 16. When resting on a side 21, 23, the rechargeable device 14 may appear to lie flat, in a natural position within the charging cavity 16.

The contact pad charger 12 may include a base 30 and a lid 32, which may be opened for exposing the charging cavity 16 and may be closed to initiate charging of the rechargeable device 14. The contact pad charger 12 may also include a pin assembly 34 for disconnecting the electrical connection between the conductors 28 of the base 30 and the conductors 29 of the lid 32, for example, when the lid 32 is opened. In some embodiments, the rechargeable device 14 cannot be charged until the lid 32 is closed.

The rechargeable device 14 may be a hearing device, such as a BTE, as shown in the illustration. In some embodiments, the device body 18 includes one or more sides 21, 23 (see FIG. 6) having the charging portion 20. The charging portion 20 provides an electrical path from the exterior (e.g., outer surface) of the rechargeable device 14 to a power storage device 132 (see FIG. 7) within the device body 18, which may be used to power the device 14 and may require recharging from time-to-time.

The device body 18 may include more than one charging portion 20. In the illustrated embodiment, the device body 18 includes a first side 21 with a first charging portion $20_A$ (see also FIG. 8) and a second side 23 opposite the first side 21 with a second charging portion $20_B$ (see FIG. 8). The second charging portion $20_B$ may be symmetrical, or mirror, the first charging portion $20_A$. Each charging portion 20 may include a conductive material, such as gold, copper, or any other suitable conductive metal or material. In one or more embodiments, the conductive material is rigid. Other portions of the device body 18 may be non-conductive, and one or more portions may be formed of a material that is suitable for contact with the skin of a user, inside or outside of the ear.

The extension portion 22 may extend from the device body 18. In one or more embodiments, the extension portion 22 may be non-charging (e.g., may not include an exterior contact for charging). In some embodiments, the extension 22 may include components that can be powered. For example, the extension portion 22 may include a transducer to produce sound, which may be inserted into an ear or ear canal during use and is electrically powered by the device body 18. In some embodiments (not shown), the rechargeable device 14 does not include an extension portion 22 (e.g., ITC, ITE, or CIC type hearing aids), and the device body 18 defines most or all of the exterior shape of the rechargeable device 14.

The extension portion 22 may be permanently or removably attached to the device body 18. In some embodiments, the contact pad charger 12 accommodates the device body 18 with the extension portion 22 attached. As illustrated, when the rechargeable device 14 is placed into the contact pad charger 12, the extension portion 22 may extend out of the charging cavity 16 and over the liner 24 of the contact pad charger 12, terminating in the well 26 of the contact pad charger 12. The well 26 may surround and protect the extension portion 22 while the rechargeable device 14 is placed in the contact pad charger 12. In some embodiments, the well 26 may be modular and be formed from a housing that is separate from housings 31, 33 and can be coupled or mated to the contact pad charger 12 in a permanent or releasable manner. In some embodiments (not shown), the contact pad charger 12 does not include the well 26, and the extension portion 22 may extend out of the contact pad charger 12.

The well 26 may be positioned laterally relative to the charging cavity 16 in the contact pad charger 12. The contact pad charger 12 may include two wells 26. The lateral arrangement of wells 26 with one or more charging cavities 16 can contribute to a low-profile (e.g., height) overall for contact pad charger 12, which may be convenient for storage or travel. For example, as illustrated, the contact pad charger 12 may form an elongate rectangular or tube-like shape.

The charging cavity 16 may define a space larger than the rechargeable device 14 to be able to receive the rechargeable device 14 in more than one orientation when one of the sides 21, 23 (see FIG. 6) of the rechargeable device 14 rests in the charging cavity 16 (e.g. the charging surface 36 formed on the conductor 28, which may be described as a floor of the charging cavity 16). For example, the rechargeable device 14 may be freely rotated in the charging cavity 16 while one of the sides 21, 23 of the rechargeable device 14 rests in the charging cavity 16. In some embodiments, the rechargeable device 14 may be freely rotated up to 180 degrees, up to 90 degrees, up to 45 degrees, up to 30 degrees, up to 15 degrees, or up to 10 degrees within the charging cavity 16 during charging.

In some embodiments, the rechargeable device 14 may be placed on either side 21, 23 (see FIG. 6) regardless of the particular polarities of the charger 12 or the device 14. Either or both of the charger 12 and the device 14 may have a predetermined charging polarity. For example, the conductor 29 of the lid 32 may be electrically positive relative to the conductor 28 of the base 30 when connected to a power source 48. Similarly, one side 21, 23 (see FIG. 6) of the rechargeable device 14, and related charging portions 20, may be electrically positive relative to the other side 21, 23 of the rechargeable device 14, and related charging portions 20. In some embodiments, one or both of the charger 12 and the device 14 may include power management electronics for accommodating either orientation of the device 14 in a charging cavity 16 (e.g., a "right side up" or an "upside-down" polarity). For example, the device 14 may include a rectifying circuit, as is further described herein.

In some embodiments, the charging cavity 16 is larger than the rechargeable device 14 in at least one dimension when the rechargeable device 14 is resting in the charging cavity 16. In some embodiments, the charging cavity 16 is larger than the rechargeable device 14 in two dimensions when the rechargeable device 14 is resting in the charging cavity 16. For example, such dimensions may be substantially parallel to a charging surface 36 of the charging cavity 16.

In the illustrated embodiment, the charging cavity 16 is formed as a rectangular prism with rounded corners and side surfaces formed by the liner 24 and top and bottom surfaces formed by the conductors 28, 29, which may be compressible conductors, and may be described as contact pads 25 with flexible charging surfaces 36. The charging cavity 16 may be any suitable shape for accommodating the rechargeable device 14 and making contact with its charging portions 20.

In some embodiments, one or more of the conductors 28, 29 are compressible. In some embodiments, one or more of the conductors 28, 29 are non moveable or non-compressible. In some embodiments, one of the conductors 28, 29 is compressible and one of the conductors 28, 29 is non-moveable or non-compressible.

Each of the conductors 28, 29 may conduct electrical power throughout its cross-section. The conductors 28, 29 may be compressible and may be formed of a resiliently deformable material. In some embodiments, the compressible conductors 28, 29 are formed of an electrically conductive elastomer material (e.g., is elastomeric). In some embodiments, the compressible conductors 28, 29 are formed of a material capable of withstanding periodic use of cleaning solvents to remove residue from the surface of the conductor. In some embodiments, the compressible conductors 28, 29 are formed of a material free of mechanical or electrical hysteresis, which may prevent deformation over time that may adversely affect charging. In some embodiments, the compressible conductors 28, 29 include a carbon-doped silicone rubber.

Figure 6:
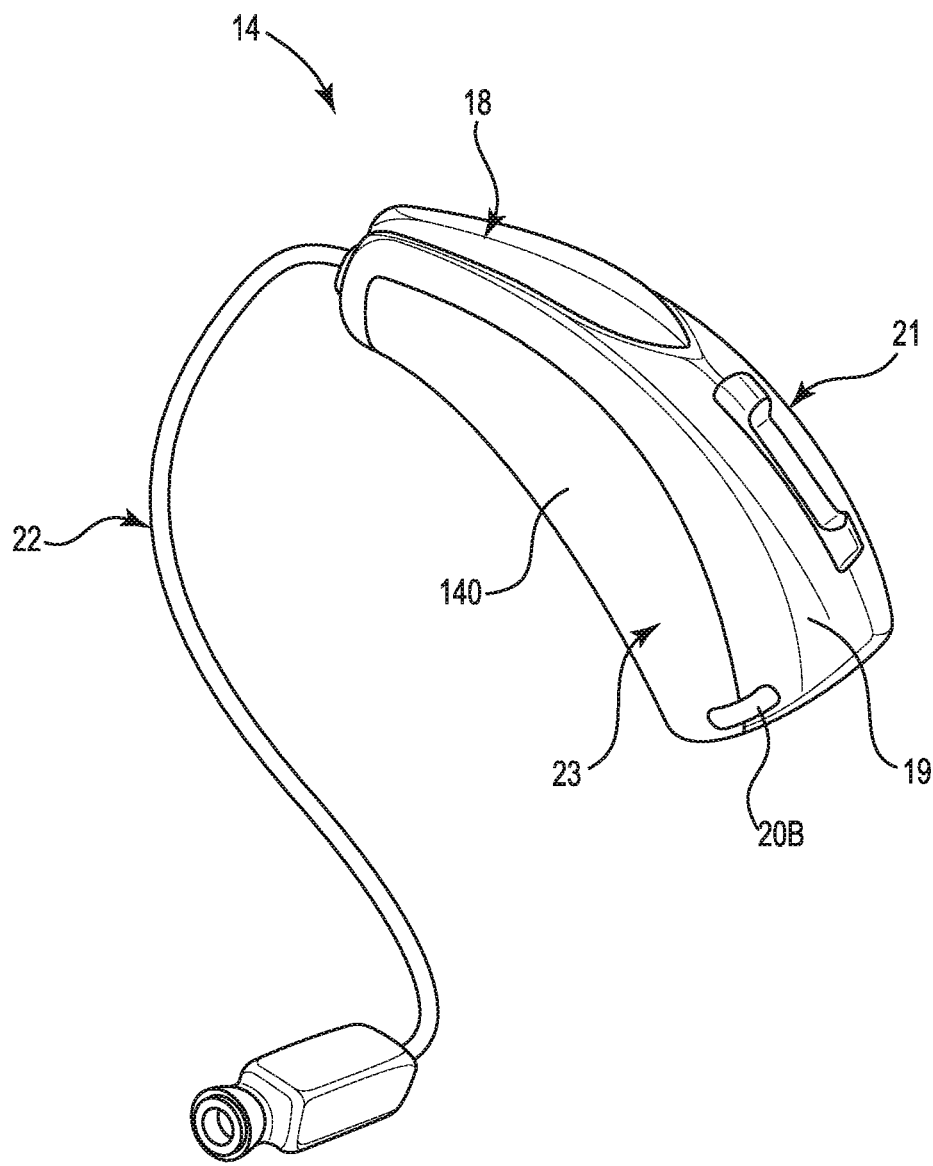
FIG. 6 is a perspective view of the rechargeable device of FIG. 1.

In some embodiments, the device body 18 of the rechargeable device 14 is rigid and non-flat, and the conductors 28, 29 are compressible and can at least partially conform to the rigid and non-flat shape of the device body 18 (e.g., including charging portions 20 and non-charging portions 19 of the body 18 as shown in FIG. 6) to maintain electrical contact with the surface of the charging portions 20. In some embodiments, the charging cavity 16 is defined by two compressible conductors 28, 29, which oppose one another. In some embodiments, one of the conductors 28, 29 is compressible and the other conductor 28, 29 is rigid.

Compressible conductors 28, 29 may have an inherent electrical resistance value that varies in response to the amount of deformation of the material, such as compression, flexion, or stretch in the material. Further, compressible conductors 28, 29 may appear to have a variable resistance due to build-up of ambient contaminants (e.g., oil residue and dust) on exposed surfaces (e.g., flexible charging surfaces 36) of the conductors 28, 29 or the charging portion 20 in contact with the conductors 28, 29. In some embodiments, the resistance of compressible conductors 28, 29 may appear to vary up to about one order of magnitude while still maintaining a high enough conductivity, or low enough resistance, to provide a desirable charging rate for the rechargeable device 14 (e.g., on the order of seconds, minutes, or hours).

Figure 3:
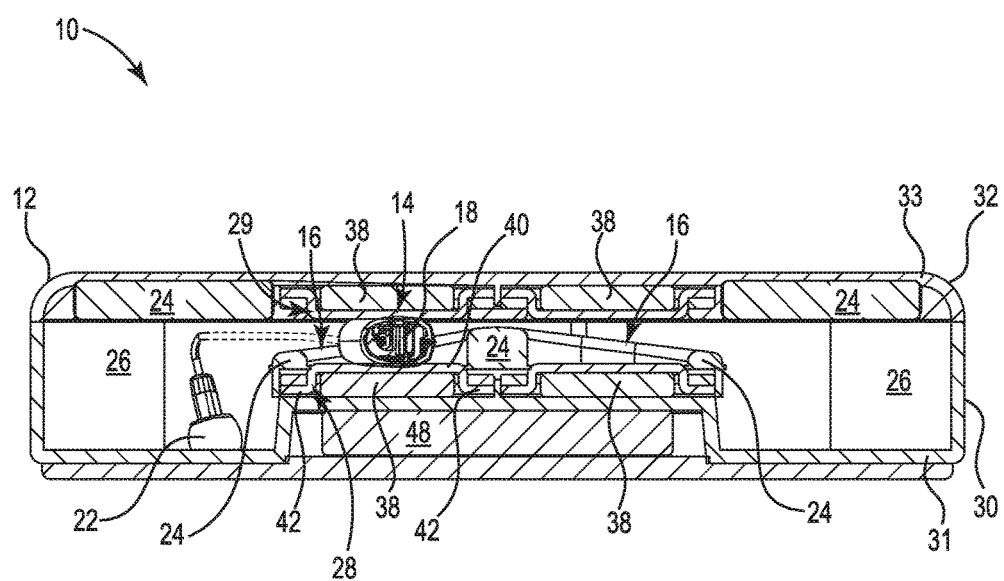
FIG. 3 is a cross-sectional side view of the recharging system of FIG. 1.
Figure 4:
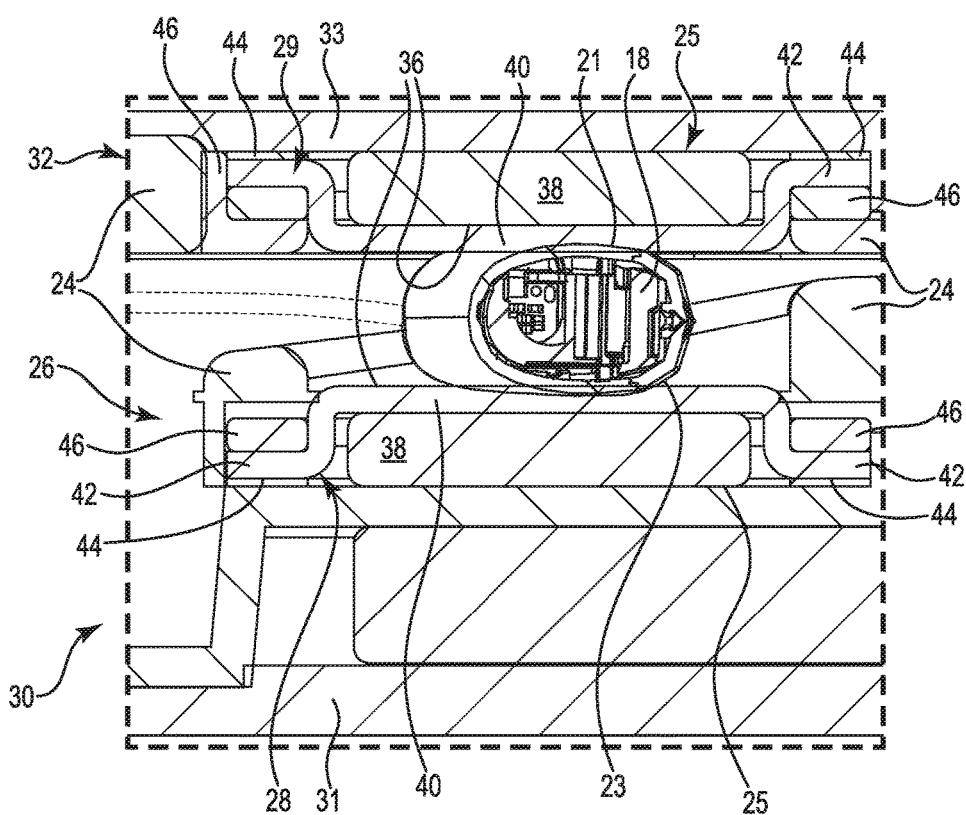
FIG. 4 is a partial view of the cross-sectional side view of FIG. 2 showing the recharging system of FIG. 1.

The resistance across compressible conductors 28, 29 (e.g., from the rechargeable device 14 to a contact plate 44 shown in FIGS. 3-4) may be defined to include both inherent and external variations. In some cases, the resistance across each compressible conductor 28, 29 may range from about 100 ohms, about 200 ohms, or about 300 ohms (e.g., when clean) to about 1500 ohms, about 1300 ohms, or about 1200 ohms (e.g., when dirty). In some embodiments, the resistance across the compressible conductors 28, 29 may range from about 300 ohms to about 1200 ohms while being capable of maintaining a desirable charging rate of the rechargeable device 14.

Heat may be dissipated across the compressible conductors 28, 29 due to the inherent resistance. The resistance may encourage drying of the rechargeable device 14, which may be particularly useful in humid environments. In some embodiments, the resistance may cause the compressible conductors 28, 29 to increase in temperature by greater than or equal to about 2 degrees Centigrade, about 4 degrees Centigrade, or about 6 degrees Centigrade. In some embodiments, the resistance may cause the compressible conductors 28, 29 to increase in temperature by no more than about 10 degrees Centigrade, about 8 degrees Centigrade, about 6 degrees centigrade, about 4 degrees Centigrade, or about 2 degrees Centigrade. In some embodiments, the temperature may increase in a range from about 2 degrees Centigrade to about 6 degrees Centigrade. In one or more embodiments, the temperature may increase by about 4 degrees Centigrade.

The liner 24 of the contact pad charger 12 may be formed of a non-conductive material (e.g., electrically insulating material). The liner 24 may be formed of a resiliently deformable material. In some embodiments, the liner 24 is formed of a semi-rigid material, which may be a low durometer material. In some embodiments, the liner 24 has a lower durometer than the compressible conductors 28, 29 to allow extrusion outward when compressed. The liner 24 may be formed of any suitable material capable of at least partially defining the charging cavity 16.

In some embodiments, the lid 32 is attached to the base 30 and is moveable between the open position (see FIG. 1) and a closed position (see FIGS. 3-4). In some embodiments, the lid 32 covers charging cavities 16 and wells 26. In some embodiments, the lid 32 may cover only one or more charging cavities 16. The base 30 and the lid 32 may each include a housing 31, 33 that defines at least a portion of an exterior (e.g., outer surface) of the contact pad charger 12. The housings 31, 33 may be formed of a plastic or any other suitable material for forming a container. In some embodiments, the housings 31, 33 are rigid.

The lid 32 may be hingedly attached to the base 30. In some embodiments, any other suitable attachment may be used, such as a sliding attachment or a releasable attachment.

In one or more embodiments, the base 30 includes the compressible first conductor 28, and the lid 32 includes the compressible second conductor 29. As shown in the illustrated embodiment, the base 30 includes two compressible first conductors 28, and the lid 32 includes two compressible second conductors 29. Each pair of conductors 28, 29 forms the charging cavity 16 and allows a pair of rechargeable devices, such as rechargeable device 14, to be charged concurrently. Also, as illustrated, pairs of first conductors 28 may be positioned laterally relative to one another, and pairs of second conductors 29 may be positioned laterally relative to one another. In some embodiments, a portion of the liner 24 separates the two charging cavities 16. In some embodiments (not shown), the liner 24 does not separate the two charging cavities 16.

As illustrated, the lid 32 may be moved into an open position to expose the charging cavity 16 and to allow placement of the device body 18 into the charging cavity 16 and the extension portion 22 into the adjacent well 26. The rechargeable device 14 may be placed in either natural resting position on either side 21, 23 (see FIG. 6) of the device body 18 on the conductor 28 of the base 30 and in various rotational orientations. The charging portions 20 may be, but do not need to be, in electrical contact with the conductors 28, 29 of the base 30 or the lid 32 when the contact pad charger 12 is in in the open position.

The lid 32 may be moved into a closed position with the rechargeable device 14 in the particular orientation as placed, and the lid 32 may be secured to the base 30 by a securing mechanism 92, such as a releasable tab and detent assembly. In the closed position, the first and second conductors 28, 29 are positioned to contact first and second charging portions $20_{A,B}$ (see FIG. 8), respectively or vice versa. The rechargeable device 14 may be compressed between first and second conductors 28, 29 of the charging cavity 16. The compression may facilitate contact between the conductors 28, 29 and the charging portions 20. Also, the compression may facilitate securing the rechargeable device 14 within the charging cavity 16 of the contact pad charger 12, for example, while the contact pad charger 12 is moved or transported while being charged.

The pin assembly 34 of the contact pad charger 12 may be at least partially disposed on the base 30 and the lid 32. For example, the pin assembly 34 may include two opposing pins (e.g., pogo pins), with one attached to each of the base 30 and the lid 32, and at least one pin being spring-loaded to engage the other when the lid 32 is closed. The pin assembly 34 may separate the pins to electrically uncouple or disconnect the one or more conductors 29 of the lid 32 from the power source 48 when the lid 32 is opened. The separable portions of the pin assembly 34 may engage to electrically couple or connect the conductors 29 of the lid 32 to the power source 48 when the lid 32 is closed. As the opposing pins engage and disengage, the pins may scratch one another. The lid 32 may be described as a scratching connect-disconnect lid.

In some embodiments, the contact pad charger 12 does not include a power switch (e.g., on/off switch). In some embodiments, closing the lid 32 turns on the contact pad charger 12 or otherwise completes a circuit to activate charging and opening the lid turns off the contact pad charger or otherwise breaks the circuit.

In some embodiments, the pin assembly 34 is adjacent to the hinged attachment between the base 30 and the lid 32. In some embodiments, any other suitable position may be used. With a separable pin assembly 34, a conductive object in accidental contact with the first and second conductors 28, 29, while the lid 32 is in the open position, may be less likely to cause an electrical short and damage electronics in the contact pad charger 12. Although a pin assembly 34 is shown, any suitable type of assembly or device for establishing a selective electrical connection may be utilized.

The pin assembly 34 may facilitate the use of a modular lid 32. The lid 32 may be removable and replaceable with a different lid 32 that may be designed to specifically fit other devices. In some embodiments, the base 30 and the lid 32 are not connected by an electrically conductive wire or flex circuit. In some embodiments, the pin assembly 34 provides the electrical connections between the base 30 and the lid 32. The lid 32 may be removably attached or hinged to the base 30, and the pin assembly 34 may include a base portion and a lid portion being separable from each other. In some embodiments, active components of the contact pad charger 12 may be disposed on or within the base 30 (e.g., indicators, batteries, controllers), except for passive elements on or within the lid 32 (e.g., conductors).

The color of the conductors 28, 29 may be different from the liner 24 to provide contrast between the charging cavity 16 and other portions of the contact pad charger 16. The liner 24 may form a functional depth to the charging cavity 16 that also provides an easily discernable depression for resting the rechargeable device 14.

An indicator 90 may provide a user with an indication related to the status of the contact pad charger 12, which may, for example, be visual or aural. In some embodiments, the indicator 90 is a visual indicator that is positioned to be visible to the user when the contact pad charger 12 is closed (e.g., on the contact pad charger 12). Non-limiting examples of indicators include an LED, an LCD, an OLED, and a speaker. In some embodiments (not shown), the indicator 90 may be remote from the contact pad charger 12 (e.g., on a smartphone connected by wire or wirelessly to the contact pad charger 12). Non-limiting examples of indications include statuses related to a charging progress, a charging error, or a cleaning reminder. The indicator 90 may be activated by any suitable condition, such as the closing of the lid 32, placement of the rechargeable device 14 into the charging cavity 16, or some other condition related to the contact pad charger 12 (e.g., low battery voltage or connection to external power supply).

As perhaps best shown in FIGS. 3 and 4, the contact pad charger 12 is shown in the closed position with the rechargeable device 14 placed for charging in the charging cavity 16. In the illustrated embodiment, the rechargeable device 14 may engage flexible charging surfaces 36 of compressible conductors 28, 29 in the closed position of the contact pad charger 12. On an opposite side of the conductors 28, 29 from the flexible charging surfaces 36, optional insulators 38 may be provided between the conductors 28, 29 and the respective housings 31, 33 of the base 30 and the lid 32 to provide additional cushion travel. The conductors 28, 29 may define an interior portion 40 and a perimeter portion 42. The flexible charging surface 36 of each conductor 28, 29 may be defined by the interior portion 40. The perimeter portion 42 may be electrically coupled to the contact plate 44, which can electrically couple the rechargeable device 14 to charging electronics in the contact pad charger 12, such as an optional power source 48 via the interior portion 40. The perimeter portion 42 may be coupled between the contact plate 44 and a retainer frame 46. Various components of the contact pad charger 12 may be coupled by any suitable means, such as an adhesive (e.g., double-sided tape or glue).

In some embodiments, the insulators 38 are formed of a different material than the conductors 28, 29. For example, the insulators 38 may be formed of electrically insulating, or non-conductive, material. The material of the insulators 38 may be resiliently deformable. The insulators 38 may be described as compressible, similar to the conductors 28, 29. In some embodiments, the insulators 38 have a lower durometer than the compressible conductors 28, 29 to allow the conductors to extrude when compressed. In one or more embodiments, the insulators 38 have a significantly lower durometer than the compressible conductors 28, 29, such as about 10% lower, about 20% lower, about 25% lower, about 33% lower, about 50% lower, or even lower. In some embodiments, the insulators 38 are formed of a closed cell foam material.

In some embodiments, the conductors 28, 29 may be pre-formed and placed over the insulator 38. For example, the conductors 28, 29 may be formed of a transfer molded piece of material. In some embodiments, the conductors 28, 29 may be printed or deposited onto the insulator 38, for example, as a conductive ink or paint.

The conductors 28, 29 may be thick enough to provide sufficient electrical conductivity yet thin enough to provide sufficient deformability to nest the rechargeable device 14 in the charging cavity 16. In some embodiments, the conductors 28, 29 have a thickness that is less than about 200 mils (e.g., 0.2 inches), less than about 100 mils, less than about 75 mils, less than about 50 mils, or less than about 25 mils. In some embodiments, the conductors 28, 29 have at thickness of about 50 mils.

As shown in the illustrated embodiment, the insulators 38 may be thicker than the conductors 28, 29. For example, the insulators 38 may be thicker by about 1.5, about 2, or about 3 times the thickness of the conductors 28, 29. In some embodiments, the insulators 38 are about 2 times the thickness of the conductors 28, 29.

One of the conductors 28, 29 and one of the insulators 38 may together define the contact pad 25 and may be described as a pillow block. The contact pad 25 may nest at least one side 21, 23 (see FIG. 6) of a resting rechargeable device 14, particularly upon closure of the lid 32. As illustrated, an example contact pad 25 extends from a flat surface, such as a housing 31, 33 of the base 30 or lid 32, and includes one of the compressible insulators 38 supporting one of the compressible conductors 28, 29 at least adjacent to the interior portion 40. A perimeter portion 42 of the compressible conductor 28, 29 can be directly coupled to a contact plate 44 to form an electrical connection. The perimeter portion 42 and the contact plate 44 may be laterally adjacent to the insulator 38. The contact plate 44 can be coupled to the same surface of the respective housing 31, 33 as the insulator 38. The perimeter portion 42 may be compressed between the contact plate 44 and the retainer frame 46, for example, by a fastener that extends between the respective housing 31, 33 and the retainer frame 46. A side wall may be formed between the interior portion 40 and the perimeter portion 42 based on the height of the insulator 38 minus the height of the contact plate 44.

In the illustrated embodiment, the insulators 38 are interior to perimeter portions 42 and contact plates 44. In some embodiments, either or both of the perimeter portions 42 and contact plates 44 may not completely surround the interior portion 40 while still providing a high conductivity (e.g., low resistance) path between the interior portion 40 and the power source 48. As shown, the perimeter portions 42 and contact plates 44 surround the insulator 38 on at least two sides. In some embodiments, the perimeter portions 42 and contact plates 44 surround the insulator 38 on four sides. In some embodiments, the perimeter portions 42 and contact plates 44 extend entirely around the insulator 38.

Without the presence of the rechargeable device 14 resting in the charging cavity 16, the contact pads 25 (e.g., pillow blocks) form relatively flat flexible charging surfaces 36 (see, e.g., the right charging cavity 16 as shown in FIG. 3). The low walls of the liner 24 may provide easy access for cleaning the flexible charging surfaces 36.

To accommodate various orientations of the rechargeable device 14, the flexible charging surface 36 or interior portion 40 of each conductor 28, 29 may define a contact area larger than corresponding charging portions 20 on the device body 18. In some embodiments, the flexible charging surface 36 or interior portion 40 may define a contact area larger than a corresponding profile of an entire side 21, 23 of the device body 18 (e.g., profile of the device body 18 when resting on the flexible charging surface 36). In one or more embodiments, the liner 24 may at least in part define a boundary of the flexible charging surface 36, which may be a rectangular area having edges ranging from about 1.2 inches to about 1.5 inches in length.

A rechargeable device 14 is shown in one of the charging cavities 16 (see, e.g., left charging cavity 16 as shown in FIG. 3) with the lid 32 closed. As illustrated, the width of the rechargeable device 14 is about equal to, but may be greater than, the height of the charging cavity 16 between the conductors 28, 29 of the base 30 and the lid 32. The width of the rechargeable device 14 may also be described as the height of the rechargeable device 14 when resting in the charging cavity 16. A pair of contact pads 25 may accommodate this height difference and may accommodate a range of height differences depending on the particular rechargeable device placed into the charging cavity 16, particularly when at least one contact pad 25 is compressible.

When the contact pad 25 is compressed by the presence of the rechargeable device 14, the conductor 28, 29 may extrude into the insulator 38 and outwardly into the low-durometer liner 24. The insulator 38 may also be compressed between the conductor 28, 29 and the housing 31, 33 of the base 30 or lid 32.

The extension portion 22 of the rechargeable device 14 is shown in one of the wells 26 (e.g., left well as shown in FIG. 3). A gap or space may be formed between the liners 24 of the base 30 and the lid 32 between the charging cavity 16 and the adjacent well 26 through which the extension portion 22 may extend from the body 20 of the rechargeable device 14.

Compressible conductors 28, 29 may define a variable resistance between the interior portions 40 and the perimeter portions 42 in response to the deformation of each conductor 28, 29, for example, by the size and shape of the rechargeable device 14, as well as the particular orientation, which may vary with each placement. In some orientations, the rechargeable device 14 may not deform the conductors 28 of the base 30 and the lid 32 evenly (e.g., to the same degree or in the same manner).

The contact pad charger 12 can include charging electronics 100 for delivering electrical power to the rechargeable device 14 from a power supply 104. The contact pad charger 12 may also include a controller 102 that may facilitate charging and may also communicate with the rechargeable device 14 for updating one or more indicators 90 on the contact pad charger 12.

Figure 5:
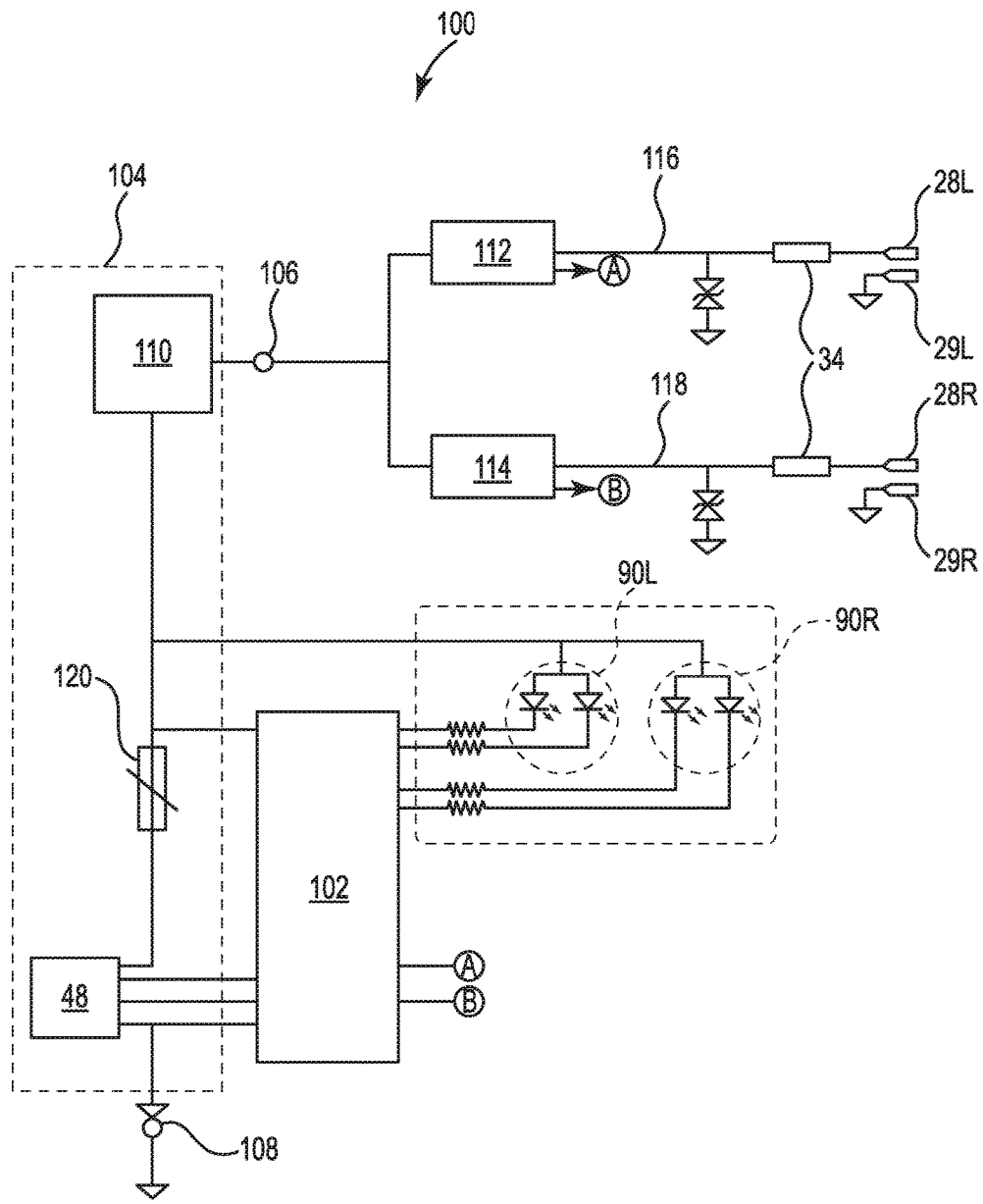
FIG. 5 is a schematic view of charging electronics in the contact pad charging apparatus of FIG. 1.

Perhaps as best shown in FIG. 5, the controller 102 may be coupled to the power supply 104. The power supply 104 can include a power source 48, such as a battery, a connection to an external power supply, or both. In some embodiments, the power source 48 is a battery capable of charging a rechargeable device over several days of use without itself being recharged (e.g., a 900 mAh Li-ion rechargeable battery may be used for portable charging of a hearing assistance device for about 5-7 days). The power supply 104 may also include a boost regulator 110 to provide a supply voltage across a first power terminal 106 and a second power terminal 108. The supply voltage may be greater than the voltage from the power source 48 (e.g., source voltage). The power supply 104 can further include an overcurrent protection 120 (e.g., a resettable fuse, such as a positive temperature coefficient device) between the power source 48 and electrically-connected components.

In one or more embodiments, the first power terminal 106 may be considered a positive terminal. The second power terminal 108 may be considered a ground or a negative terminal. The positive or negative orientation of the terminals 106, 108 may be defined as a polarity and may be based on the orientation of the power source 48, which may be a direct current (DC) power source.

Current from the power supply 104 at the first power terminal 106 may be split between a first sense circuit 112 and a second sense circuit 114, which may each be used to detect modulation in a first current portion 116 and a second current portion 118, for communication between the rechargeable device 14 and the controller 102. For example, the sense circuits 112, 114 may be configured to detect communication current over the powerline having a substantially high impedance (e.g., due the conductors 28, 29).

The first current portion 116 can provide charging to conductors $28_L$, $29_L$ (e.g., the left conductor 28 coupled to the base 30 and the left conductor 29 coupled to the lid 32 to form the left charging cavity 16). The second current portion 118 can provide charging to conductors $28_R$, $29_R$ (e.g., the right conductor 28 coupled to the base 30 and the right conductor 29 coupled to the lid 32 to form the right charging cavity 16 as shown in FIG. 2).

In the illustrated embodiment, a pin of the pin assembly 34 is electrically connected to each of the conductors $29_{L,R}$ of the lid 32. The pin assembly 34 forms an open circuit to disrupt the flows of the first and second current portions 116, 118 when the lid 32 is opened. The pin assembly 34 forms a closed circuit to operably connect the conductors $29_{L,R}$ to the power supply 104 when the lid 32 is closed to receive electrical power for charging the rechargeable device 14.

The power source 48 may include a battery, which may be rechargeable or disposable. Additionally or alternatively, the power source 48 may include a connection to an external power supply, which may be a USB connection, an AC-DC adapter, or any other suitable source of electrical power.

In some embodiments, the power source 48 provides electrical power at about 5 VDC or less. The boost regulator 110 may transform the electrical power from the power source 48 to provide a higher voltage (e.g., higher than 5 VDC). In some embodiments, the boost regulator 110 provides electrical power at the first power terminal 106 at about 12 VDC. In some embodiments (not shown), the power source 48 provides electrical power greater than about 5 VDC (e.g., 12 VDC), and a boost regulator 110 may not be necessarily be used. The higher voltage output voltage allows the charging electronics 100 to compensate for the variable resistance across the conductors 28, 29. The corresponding current at the first power terminal 106 may depend on the current demand from the connected rechargeable device at conductors $28_L$, $29_L$, conductors $28_R$, $29_L$, or combinations thereof.

The controller 102 may be coupled to the contact pad charger 12 (see FIGS. 1-5), for example, at the base 30 or the lid 32. In some embodiments, the controller 102 is coupled to the base 30. In some embodiments, the controller 102 is disposed inside the base 30.

In some embodiments, the controller 102 is configured to detect modulations in either or both of the first and second current portions 116, 118 via the respective sense circuit 112, 114 as a communication signal. For example, a sense circuit 112, 114 may utilize a low-impedance, in-series detection circuit to measure modulations in a current portion 116, 118. As illustrated, the sense circuits 112, 114 are operably connected to the controller 102 via nodes A and B (e.g., through a high-pass filter). In some embodiments, the controller 102 receives a high-frequency communication signal corresponding to the modulations in the first and second current portions 116, 118. The communication signal may contain information from the rechargeable device 14 related to charging, which may be used to provide a charging signal to an indicator 90 on the contact pad charger 12.

In some embodiments, the controller 102 provides charging signals to one or more indicators 90 in response to the communication signal, such as an indicator $90_L$ associated with a left charging cavity 16 and an indicator $90_R$ associated with a right charging cavity 16. (see FIG. 3) Upon receipt of a charging signal, the indicators $90_{L,R}$ may provide an indication associated with the respective charging cavity 16. The indicators $90_{L,R}$ may provide separate indications particular to the respective charging cavity 16.

In some embodiments, the indicators 90 each include two or more LEDs powered and controlled by controller 102. The LEDs may be used to each indicate a different status, such as a charging progress, a charging error, or a cleaning reminder. The LEDs may also used together (e.g., four LEDs together may indicate 0%, 25%, 50%, 75%, and 100% charging progress). In some embodiments, the indicators 90 may only provide a signal when the rechargeable device 14 is connected. In some embodiments, the indicators 90 may provide a signal even when no rechargeable device is connected to the charging electronics 100.

During charging, the conductors 28, 29 forming the one or more charging cavities 16 may have the same or different resistance values. The recharging system 10 may be able to compensate for different resistance values with a power manager 130. In some embodiments, the power manager 130 is disposed in the rechargeable device 14 along with other suitable charging electronics, such as charging electronics 200, as shown in FIGS. 6 to 8, to regulate power delivery to a power storage device 132.

Figure 7:
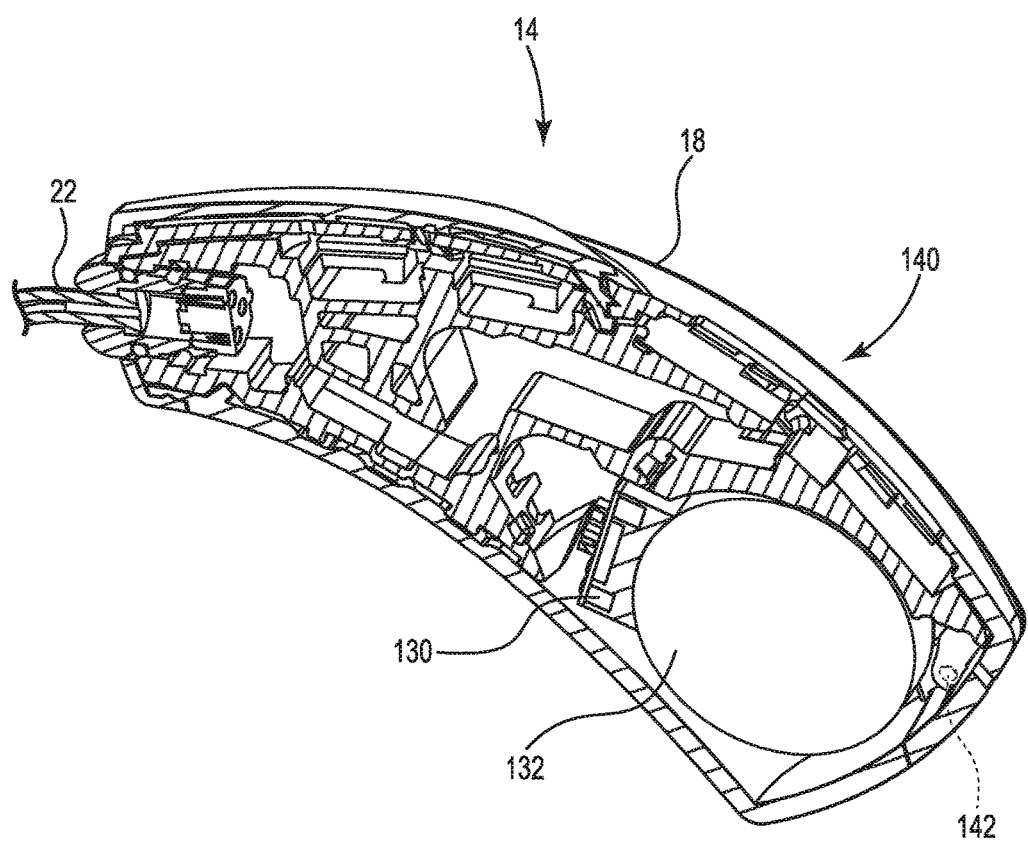
FIG. 7 is a cross-sectional elevation view of the rechargeable device of FIG. 1.
Figure 8:
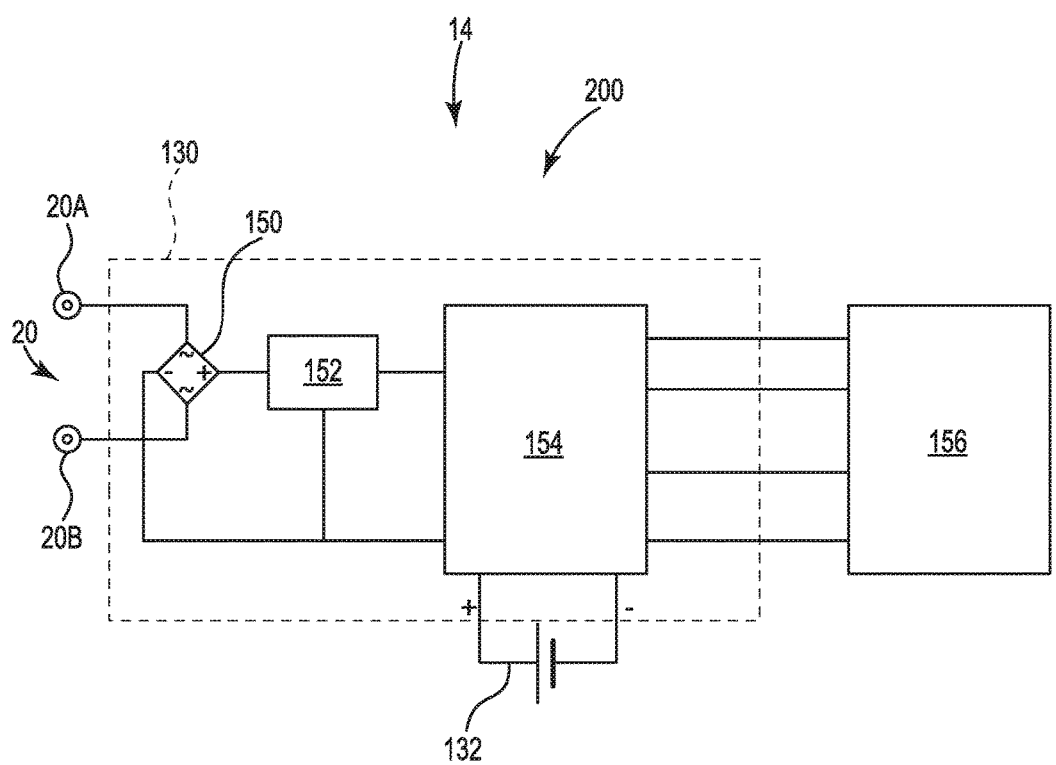
FIG. 8 is a schematic view of charging electronics in the rechargeable device of FIG. 1.

Perhaps as best seen in FIGS. 6 and 7, the charging electronics 200 including the power manager 130 and the power storage device 132 may be disposed in the rechargeable device 14 and maintained within a housing 140 defining an exterior of the device body 18. The housing 140 may include the charging portions 20 and the non-charging portions 19. The power storage device 132 may be disposed near an end of the device body 18 opposite the extension portion 22 that extends from the device body 18.

In one or more embodiments, the power storage device 132 is rechargeable. The power storage device 132 may be a battery, which may be based on Li, Ag—Zn, Ni-MH, or any other suitable rechargeable chemistry for a battery cell.

The power storage device 132 may be removable or permanently disposed within the device body 18. The device body 18 may include an optional pin 142 for hinging a battery door (not shown), which may extend from one side 21, 23 of the device body 18 to the other side 21, 23. Any suitable technique for providing a removable power storage device 132 may be utilized.

In the illustrated embodiment, the power storage device 132 is not removable, and a pin 142 is not included. The charging portions 20 may be positioned in a location near where the pin 142 would be located, which may facilitate utilization of the same antenna designs for both removable and non-removable device types.

In some embodiments, the charging portions 20 may be positioned in any other suitable location along the device body 18 that generally faces the conductors 28, 29 (see FIGS. 1-5) when positioned for charging. In the illustrated embodiment, the charging portions 20 are flush with the surface defined by the non-charging portions 19. In some embodiments, the charging portions 20 may recess from or protrude from the surface defined by the non-charging portions 19. The contact pads 25 of the contact pad charger (see FIGS. 3-4) can conform and contact such recessed or protruding charging portions 20.

The housing 140 of the device body 18 can take any suitable shape. In some embodiments, the housing 140 of the device body 18 is generally convex in shape. The charging portions of the device body 18 may also be similarly convex or flat in shape to maintain a continuous contour around the device body 18. The convex contours of the housing 140 may be nested in compressible contact pads 25 (e.g., pillow blocks) of the charging cavity 16 (see FIGS. 1-5).

The power manager 130 may be electrically coupled to the terminals 106, 108 (see FIG. 5) of the contact pad charger 12 when placed in the charging cavity 16 and the lid 32 is closed (see FIGS. 3-4). The power manager 130 may include a rectifying circuit 150, which allows the rechargeable device 14 to receive electrical power at any polarity across the charging portions 20, to provide electrical power at a predetermined DC polarity to charging electronics 200 within the rechargeable device 14 (e.g., the power storage device 132). As a result, the rechargeable device 14 can be charged with either side 21, 23 placed down in the charging cavity 16 and is not limited to a particular "right side up" orientation.

In some embodiments (not shown), the power manager 130 may be included in the contact pad charger 12 instead of the rechargeable device 14. In such embodiments, the charging of the power storage device 132 in the rechargeable device 14 may be more difficult to manage current flow received at the power storage device 132 due to variations in resistance across the conductors 28, 29 (see FIGS. 1-5), which may vary due to inherent and external contributing factors.

Perhaps as best seen in FIG. 8, the charging electronics 200 include the first contact terminal $20_A$ and the second contact terminal $20_B$ corresponding to charging portions 20 on each opposing side 21, 23 of the rechargeable device 14, which can receive an input voltage, for example, from the contact pad charger 12 (see FIGS. 1-5). The contact terminals $20_{A, B}$ are electrically coupled to the power manager 130, which includes a rectifying circuit 150, which can translate the incoming input voltage to an appropriate predetermined polarity, a voltage regulator 152, and a power controller 154. The charging electronics 200 may be operatively coupled to device electronics 156, such as electronics to receive signals and produce sound in a hearing assistance device.

The power manager 130 may be described as being electrically coupled between the terminals 106, 108 of the power supply 48 (see FIG. 5) in the contact pad charger 12, as well as being electrically coupled between the conductors 28, 29 (see FIGS. 1-5) in the contact pad charger 12. Due to the individual voltage drop across at least each conductor in the contact pad charger 12 (e.g., a first and a second voltage drop), the input voltage across contact terminals $20_{A,B}$ and received by the power manager 130 may be less than the supply voltage from the power supply of the contact pad charger 12. In some embodiments, the input voltage remains high enough for charging the power storage device 132, which may have a minimum voltage threshold for charging.

The input voltage across contact terminals $20_{A,B}$ may also vary in magnitude depending on the variable resistances across the conductors 28, 29 in the contact pad charger 12 (see FIGS. 1-5), which may depend, for example, on the placement or type of the rechargeable device 14 in the contact pad charger 12. Movement of the rechargeable device 14 relative to the contact pad charger 12 may also cause variations in conductor resistance.

The voltage regulator 152 may allow the power manager 130 to provide a regulated output voltage to the power controller 154, the power storage device 132, the device electronics 156, or a combination thereof. Due to the voltage drops across components in the power manager 130, the regulated output voltage may be less than the input voltage. In one or more embodiments, a regulated output voltage is provided to the power controller 154, which manages the distribution of power to the power storage device 132 and to the device electronics 156.

In some embodiments, the power manager 130 can modulate the current corresponding to the input voltage across contact terminals $20_{A,B}$. For example, the power controller 154 may be configured to modulate the current drawn while charging the power storage device 132 or powering the device electronics 156. The power manager 130 may modulate the current to communicate with the controller 102 in the contact pad charger 12 (see FIG. 5). In some embodiments, the power manager 130 communicates a data to the controller 102 and/or vice versa. In some embodiments, the power manager 130 communicates the input voltage received across contact terminals $20_{A,B}$ to the controller 102.

Based on the input voltage across contact terminals $20_{A,B}$, an estimated resistance across the conductors 28, 29 in the contact pad charger 12 (see FIGS. 1-5) can be determined, for example, in response to an estimated voltage difference between a known supply voltage and the detected input voltage. In some embodiments, the controller 102 is configured to calculate the estimated resistance. Additionally or alternatively, in some embodiments, the power manager 130 is configured to calculate the estimated resistance.

In one or more embodiments, the estimated resistance is determined in response to the resistance across at least two conductors 28, 29, such as conductors $28_L$, $29_L$ or conductors $28_R$, $29_R$. If the estimated resistance is above a target resistance (e.g., about 1200 to 1500 ohms), the rechargeable device may not receive sufficient current to charge the power storage device 132 in a desired amount of time for charging (e.g., a few hours). However, the supply voltage may be set sufficiently high (e.g. 12 VDC) to allow the power storage device 132 to continue charging, even under such high resistance conditions.

The controller 102 may be configured to provide a cleaning reminder when an estimated resistance across one or more conductors $28_{R,L}$, $29_{R,L}$ (see FIGS. 1-5) is higher than a high resistance threshold (or an input voltage/current is below a low voltage/current threshold). The cleaning reminder may indicate that the charging cavity 16 is dirty, which may prompt a user (e.g., via the indicator 90 on the contact pad charger 12 as shown in FIGS. 1-5) to clean the cavity 16. In particular, the user may be prompted to clean the conductors 28, 29 of the contact pad charger 12 or the charging portions 20 of the rechargeable device 14. The cleaning can facilitate the restoration of desirable charging times.

In this manner, the recharging system described provides freedom-of-placement of a rechargeable device (e.g., a hearing assistance device) within large charging cavities or receiving pockets in a contact pad charger, which may allow a user to interact with the recharging system like a wireless charger without the need for strict placement of the device within the charger. At the same time, the recharging system described provides a direct connection between the rechargeable device and the power supply in the charger, which may allow for less complicated electronics and a more efficient use of power when charging.

Figure 9:
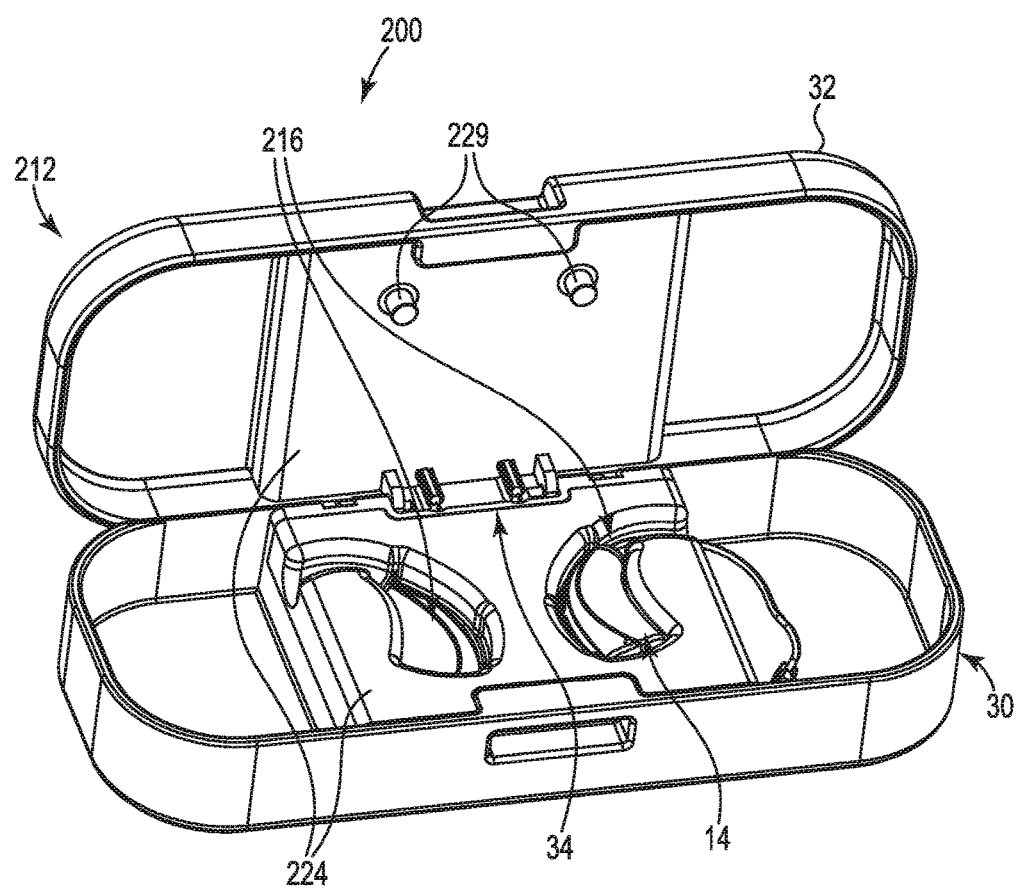
FIG. 9 is an overhead perspective view of another recharging system according to various embodiments of the present disclosure.
Figure 10:
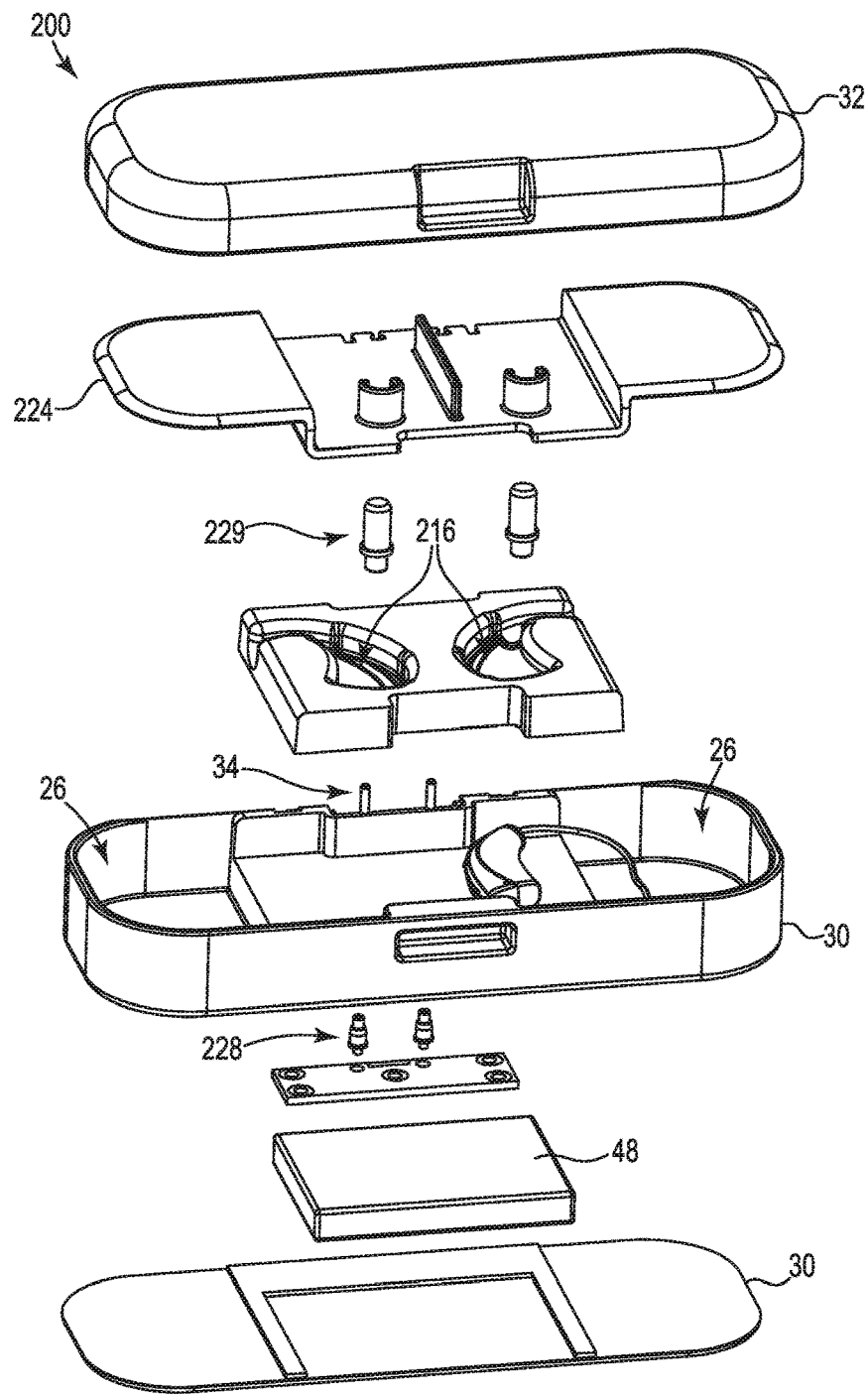
FIG. 10 is an exploded perspective view of the recharging system of FIG. 9.
Figure 11:
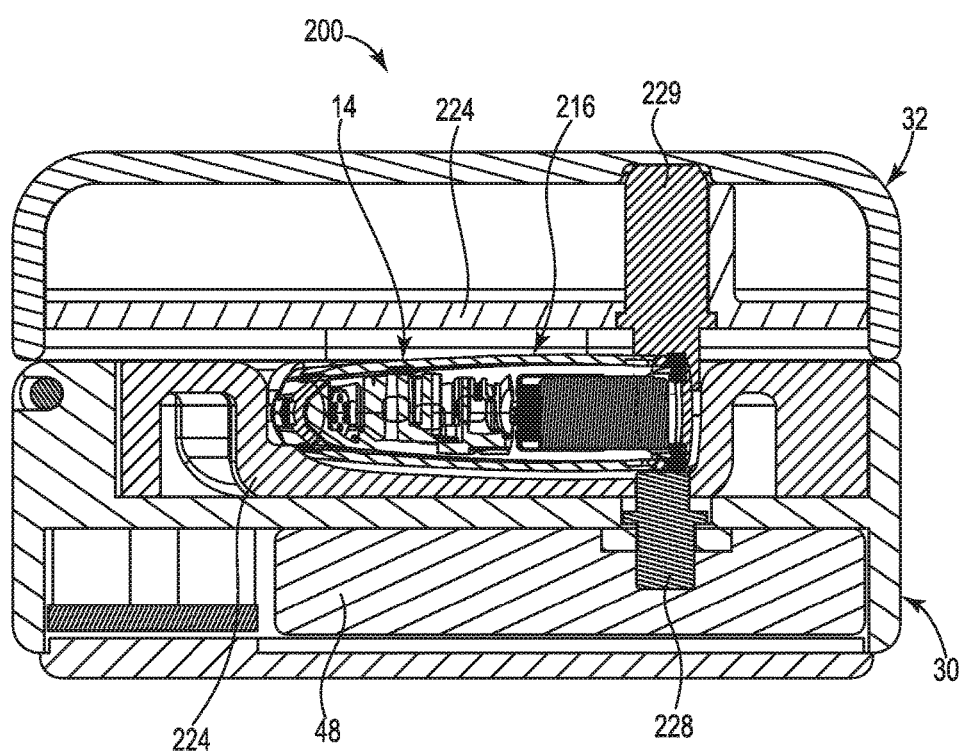
FIG. 11 is a cross-sectional elevation end view of the recharging system of FIG. 9.

Various aspects of the recharging system 10 may be used with a pogo-style embodiment of a contact pad charger, such as contact pad charger 212 in recharging system 200 shown in FIGS. 9 to 11. The contact pad charger 212 may be similar to contact pad charger 12 except as described herein. The specific features of contact pad charger 212 are not limiting, and embodiments that include or exclude one or more other aspects of recharging system 10 are also contemplated.

Similar to contact pad charger 12, for example, the contact pad charger 212 may include the pin assembly 34 and the power source 48. The same base 30 and lid 32 may be used with contact pad charger 212. The contact pad charger 212 may also define the wells 26. The rechargeable device 14 having the same circuitry may be charged with contact pad charger 212. In some embodiments, the contact pad charger 212 differs from the contact pad charger 12 in shape of the cavity 216 and the use of conductors 228, 229 (e.g., pins).

In some embodiments, contact pad charger 212 includes conductors 228, 229 (e.g., pins, such as pogo-style pins) as conductors, for example, instead of conductors 28, 29. The conductors 228, 229 may be formed of any suitable conductive material. In one or more embodiments, the conductors 228, 229 are formed of a metal material. Metal conductors 228, 229 may be compressible with a spring feature, which may allow the conductors to compress to accommodate the presence of the rechargeable device 14 in the charging cavity 216 and may apply a force to the rechargeable device to maintain an electrical connection therebetween. For example, as perhaps best shown in FIG. 11, the conductor 229 would extend further into the charging cavity 216 without the presence of the rechargeable device 14.

The conductive contact area of the conductors 228, 229 may be less than the contact area of the conductors 28, 29, and may be less flexible in terms of placing the rechargeable device 14. However, the metal conductors 228, 229 with spring features may vary less in inherent resistance than the compressible conductors 28, 29. In one or more embodiments, the metal conductors 228, 229 with spring features may be described as not varying inherently in resistance. The charging electronics may not need to be as sophisticated when used with conductors 228, 229 instead of conductors 28, 29.

In some embodiments, the charging cavity 216 is specifically formed to the shape of the rechargeable device to secure the rechargeable device 14 during charging, particularly when the recharging system 200 is being transported. For example, the liners 224 may at least partially define the charging cavity 216. The liner 224 may not deform in response to the rechargeable device 14 being placed therein.

In some embodiments, the liners 224 may define two opposing sides of the charging cavity 216. In some embodiments, a portion of the liners 224 is attached to the lid 32 and another portion of the liners is attached to the base 30. The conductors 228, 229 may extend through the corresponding liners 224 of the base 30 and the lid 32 to contact the rechargeable device 14.

In some embodiments, the contact pad charger 212 may be considered modular. The liners 224 may be removed and replaced with other liners having different shapes to accommodate rechargeable devices other than the rechargeable device 14.

Thus, embodiments of the CHARGING SYSTEM WITH COMPRESSIBLE CONTACTS are disclosed. Although reference is made to the accompanying set of drawings that form a part hereof and in which are shown by way of illustration several specific embodiments, it is to be understood that other embodiments are contemplated and may be made without departing from (e.g., still falling within) the scope or spirit of the present disclosure. The detailed description, therefore, is not to be taken in a limiting sense.

All references and publications cited herein are expressly incorporated herein by reference in their entirety into this disclosure, except to the extent they may directly contradict this disclosure.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements).

Terms related to orientation, such as "top", "bottom", "side", and "end", are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The term "and/or" means one or all of the listed elements or a combination of any two or more of the listed elements (e.g., casting and/or treating an alloy means casting, treating, or both casting and treating the alloy).

The phrases "at least one of" "comprises at least one of" and "one or more of" followed by a list refers to any one of the items in the list and any combination of two or more items in the list.

What is claimed is:

1. A system comprising:
    a power supply configured to provide a supply voltage between a first terminal and a second terminal;
    a compressible first conductor electrically coupled to the first terminal and defining a first variable resistance in response to a first conductor compression;
    a power manager electrically coupled between the first conductor and the second terminal, the power manager being configured to:
        receive a variable input voltage in response to a first variable voltage drop across the first conductor; and
        provide a regulated output voltage in response to the received variable input voltage, the regulated output voltage being less than the supply voltage; and
    a power storage device electrically coupled to the power manager and configured to receive the regulated output voltage for charging.

2. The system of claim 1, wherein the first conductor comprises an elastomer material.

3. The system of claim 1, further comprising a compressible second conductor electrically coupled to the second terminal and defining a second variable resistance in response to a second conductor compression;
    wherein the power manager is electrically coupled between the first conductor and the second conductor, the power manager being configured to receive the variable input voltage further in response to a second variable voltage drop across the second conductor.

4. The system of claim 1, wherein the power manager is configured to:
    receive a first current portion of a supply current from the power supply; and
    modulate the first current portion in response to the variable input voltage.

5. The system of claim 4, further comprising a controller configured to:
    detect the modulated first current portion; and
    provide a charging signal in response to the modulated first current portion, the charging signal representing at least one of a charging progress, a charging error, and a cleaning reminder.

6. The system of claim 5, wherein the controller is configured to provide the cleaning reminder in response to the variable input voltage being below a low voltage threshold.

7. The system of claim 1, wherein the power supply comprises a boost regulator configured to receive a source voltage lower than the provided supply voltage.

8. The system of claim 1, wherein the power supply comprises a battery.

9. The system of claim 1, wherein the power manager is configured to rectify the received variable input voltage to a predetermined polarity.

10. An apparatus for charging a rechargeable device body, the apparatus comprising:
a compressible conductor comprising an interior portion defining a flexible charging surface and a perimeter portion laterally surrounding the interior portion, the compressible conductor defining a variable resistance between the interior portion and the perimeter portion in response to a conductor deformation;
a non-conductive liner aligned to the perimeter portion, the non-conductive liner defining an opening aligned to the interior portion of the compressible conductor to define a charging cavity configured to receive the rechargeable device body for contact with the flexible charging surface, the charging cavity configured to receive the rechargeable device body for charging in more than one orientation; and
a contact plate electrically coupled to the perimeter portion and configured to be electrically coupled to the rechargeable device body in the charging cavity via the interior portion.

11. The apparatus of claim 10, wherein the contact plate is directly coupled to the perimeter portion.

12. The apparatus of claim 10, further comprising a compressible insulator comprising a thickness greater than a thickness of the compressible conductor, the compressible insulator being disposed interior to the perimeter portion and adjacent to the interior portion.

13. The apparatus of claim 10, further comprising another compressible conductor defining another flexible charging surface positioned laterally relative to the flexible charging surface of the compressible conductor.

14. An apparatus for charging a rechargeable device comprising a body comprising a first side with a first charging portion and a second side opposite the first side with a second charging portion, the apparatus comprising:
a base comprising a compressible first conductor and a compressible first insulator adjacent to the first conductor, the first conductor defining a first variable resistance in response to a first conductor deformation;
a lid comprising a compressible second conductor and a compressible second insulator adjacent to the second conductor, the second conductor defining a second variable resistance in response to a second conductor deformation, the lid being movable between an open position and a closed position relative to the base, the closed position of the lid being configured to contact the first conductor with one of the first and second charging portions and contact the second conductor with the other of the first and second charging portions; and
a charging cavity defined between the first and second conductors configured to receive the rechargeable device body for charging in more than one orientation when the lid is in the closed position.

15. The apparatus of claim 14, further comprising a separable pin assembly configured to electrically couple the second conductor and a power supply when the lid is in the closed position and to electrically disconnect the second conductor from the power supply when the lid is in the open position.

16. The apparatus of claim 14, wherein the first and second conductors each define a flexible charging surface.

17. The apparatus of claim 14, further comprising a controller coupled to the base and configured to sense a communication current from the rechargeable device body.

18. The apparatus of claim 17, further comprising a visual indicator configured to provide an indication of at least one of a charging progress, a charging error, and a cleaning reminder in response to the communication current when the lid is in the closed position with the rechargeable device body in the charging cavity.

19. The apparatus of claim 18, wherein the base comprises a second set of compressible first and second conductors and the visual indicator provides a separate indication associated with each set of compressible conductors.

20. The apparatus of claim 14, wherein the base comprises a well, the well positioned laterally relative to the charging cavity to receive a non-charging portion of the rechargeable device extending from the rechargeable device body when the lid is in the closed position.

21. A charging apparatus comprising:
a first conductor;
a second conductor, wherein at least one of the first and second conductors comprises a compressible conductor;
a charging cavity defined between the first and second conductors configured to receive a body of a rechargeable device for charging in more than one rotational orientation of the body, more than one side of the body, or both more than one rotational orientation and more than one side of the body; and
a power manager configured to provide a regulated output voltage to a power storage device of the rechargeable device in response to a variable voltage drop across a compressible contact.

22. The apparatus of claim 21, wherein the compressible conductor comprises an elastomer material.

23. The apparatus of claim 21, further comprising an insulator disposed adjacent to at least one of the first and second conductors.

24. The apparatus of claim 21, wherein the power manager is configured to:
receive a current portion of a supply current from a power supply; and
modulate the current portion in response to the variable voltage drop.

25. The apparatus of claim 21, wherein the power manager is configured to rectify a received variable input voltage to a predetermined polarity.

* * * * *